United States Patent [19]
Akatsuka et al.

[11] Patent Number: 5,091,635
[45] Date of Patent: Feb. 25, 1992

[54] OPTICAL RECORD MEDIUM INCLUDING A DATA REGION, AN IDENTIFICATION REGION AND A CONTROL DATA REGION, AND A METHOD OF RECORDING SIGNALS ON THE OPTICAL RECORD MEDIUM

[75] Inventors: Yuichiro Akatsuka, Hachioji; Takayuki Abe, Sagamihara; Akira Matsueda, Hachioji; Takao Rokutan, Higashimurayama; Nagahiro Gocho, Hachioji, all of Japan

[73] Assignee: Olympus Optical Co., Ltd., Japan

[21] Appl. No.: 595,652

[22] Filed: Oct. 9, 1990

Related U.S. Application Data

[63] Continuation of Ser. No. 121,798, Nov. 17, 1987, abandoned.

[30] Foreign Application Priority Data

Nov. 21, 1986 [JP] Japan .................... 61-276817
Nov. 21, 1986 [JP] Japan .................... 61-278078
Jan. 30, 1987 [JP] Japan .................... 62-18714

[51] Int. Cl.$^5$ ................. G06K 1/00; G11B 7/007
[52] U.S. Cl. ................. 235/494; 235/487; 235/454; 369/59; 369/275.3
[58] Field of Search ........... 235/487, 488, 494, 454, 235/456; 369/47, 48, 53, 54, 58, 59, 275.3

[56] References Cited

U.S. PATENT DOCUMENTS

| | | | |
|---|---|---|---|
| 4,229,808 | 10/1980 | Hui | 369/48 |
| 4,360,728 | 11/1982 | Drexler | 235/462 |
| 4,519,054 | 5/1985 | Jewer | 369/59 |
| 4,535,439 | 8/1985 | Satoh et al. | 369/275 |
| 4,598,393 | 7/1986 | Pierce et al. | 235/454 |
| 4,730,293 | 3/1988 | Pierce et al. | 235/454 |
| 4,733,386 | 3/1988 | Shimoi | 369/59 |
| 4,760,566 | 7/1988 | Kobayashi et al. | 369/48 |
| 4,791,622 | 12/1988 | Clay et al. | 369/48 |
| 4,811,321 | 3/1989 | Enari et al. | 369/59 |

FOREIGN PATENT DOCUMENTS

| | | |
|---|---|---|
| 0147065 | 3/1985 | European Pat. Off. |
| 0227380 | 1/1987 | European Pat. Off. |
| 0232134 | 12/1987 | European Pat. Off. |
| 58-41444 | 3/1983 | Japan ............... 369/47 |
| 59-28248 | 2/1984 | Japan ............... 369/47 |

*Primary Examiner*—Robert Weinhardt
*Attorney, Agent, or Firm*—Parkhurst, Wendel & Rossi

[57] ABSTRACT

An optical record medium in the form of a wallet-size optical card including a data region in which a number of data tracks are provided in parallel with each other, an identification region provided on one side of the data region, and a mark region provided on a side of the identification regions. Data signals are recorded in the data tracks and addresses of the data tracks are recorded in the identification region. Every time a data signal has been recorded in a data track, a mark is recorded in the mark region at such a position that the mark is aligned with the relevant data track viewed in a track direction.

2 Claims, 9 Drawing Sheets

FIG_1
PRIOR ART
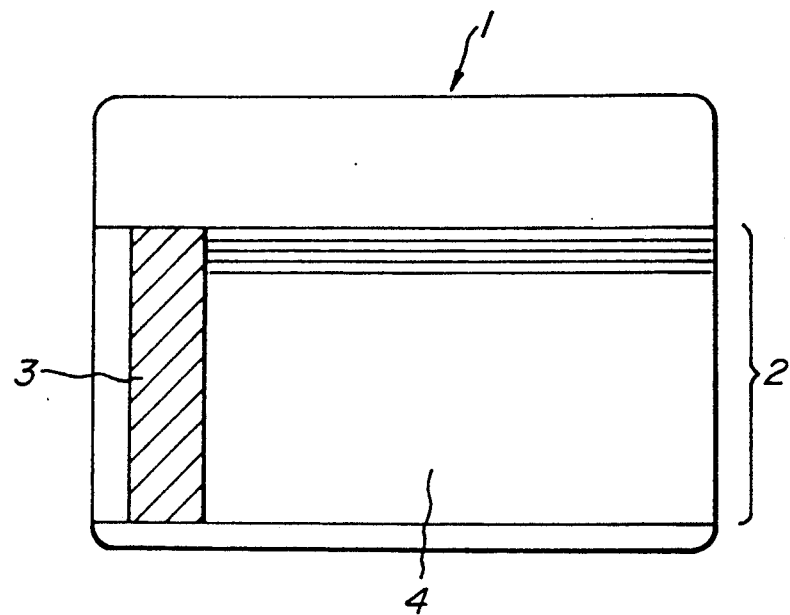
FIG_2
PRIOR ART
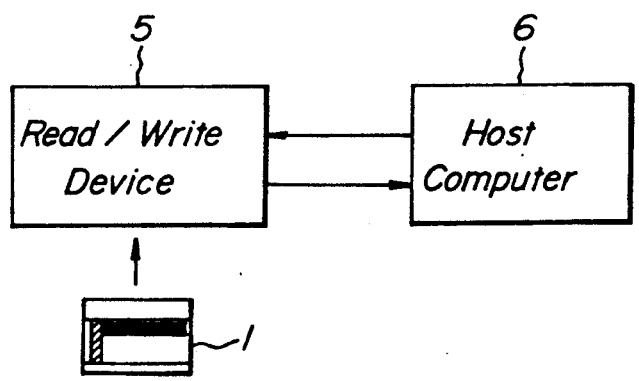

FIG_3
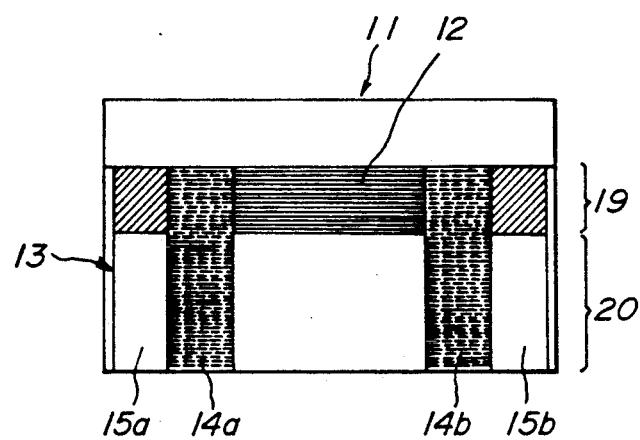
FIG_4
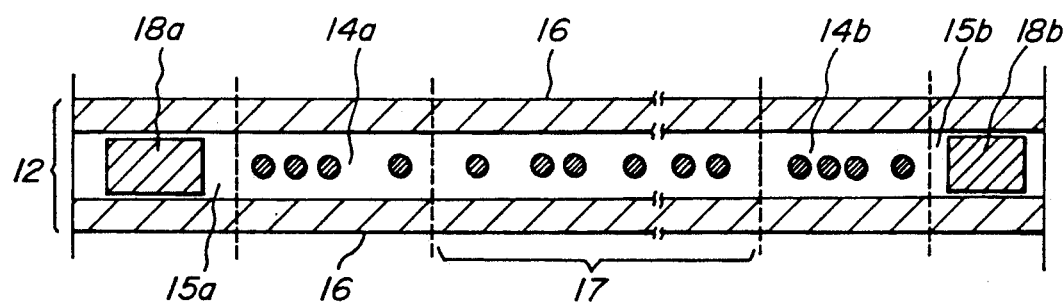

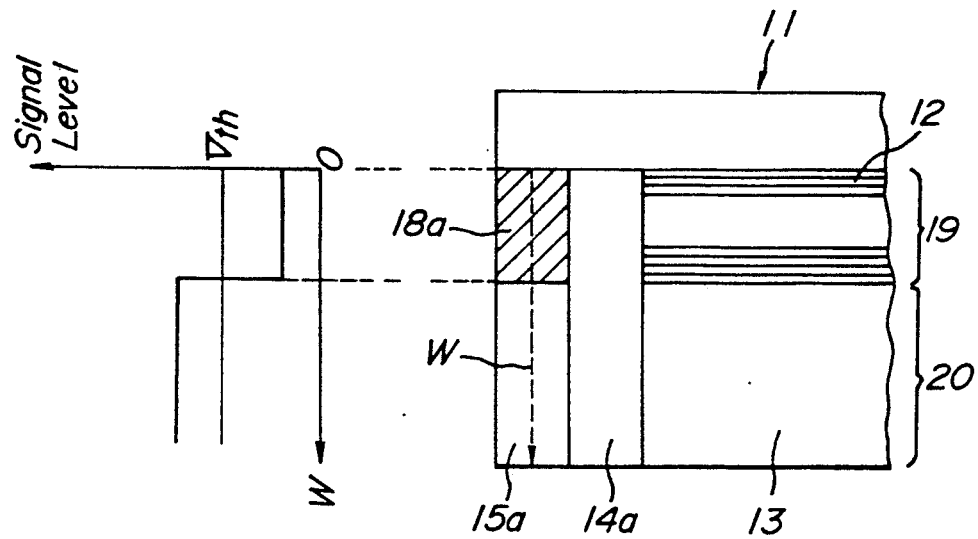
FIG._5B    FIG._5A
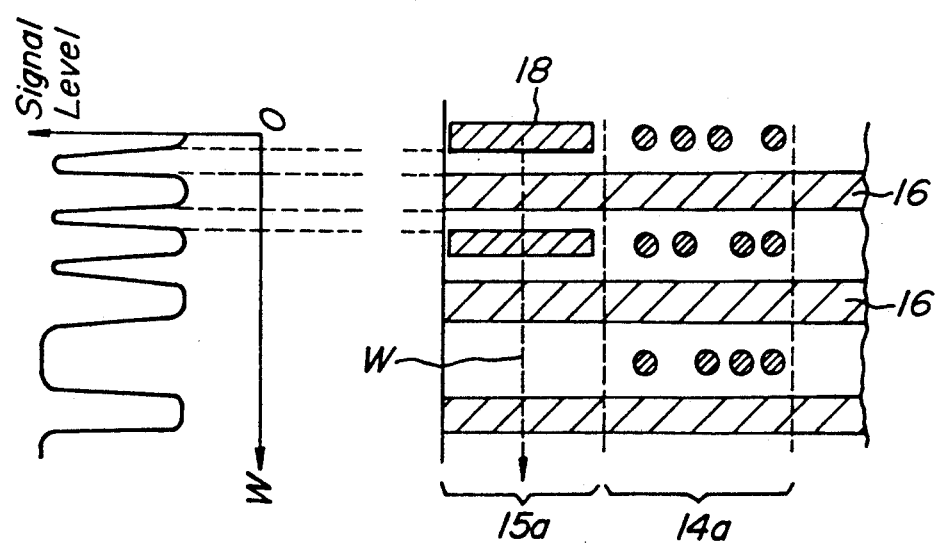
FIG._6B    FIG._6A

FIG_7
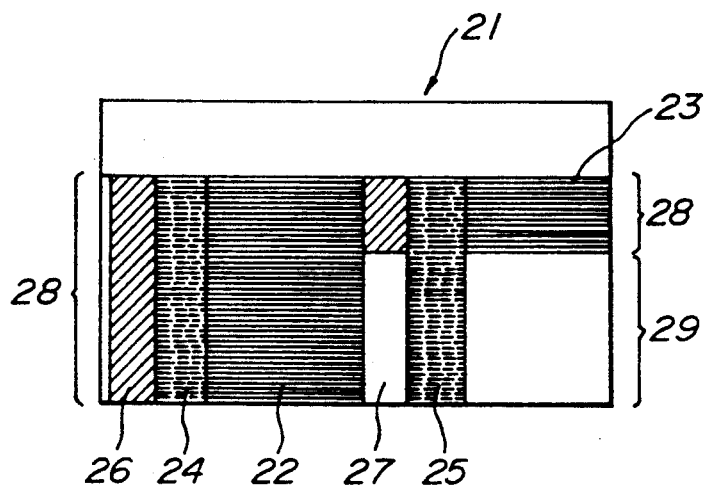
FIG_8
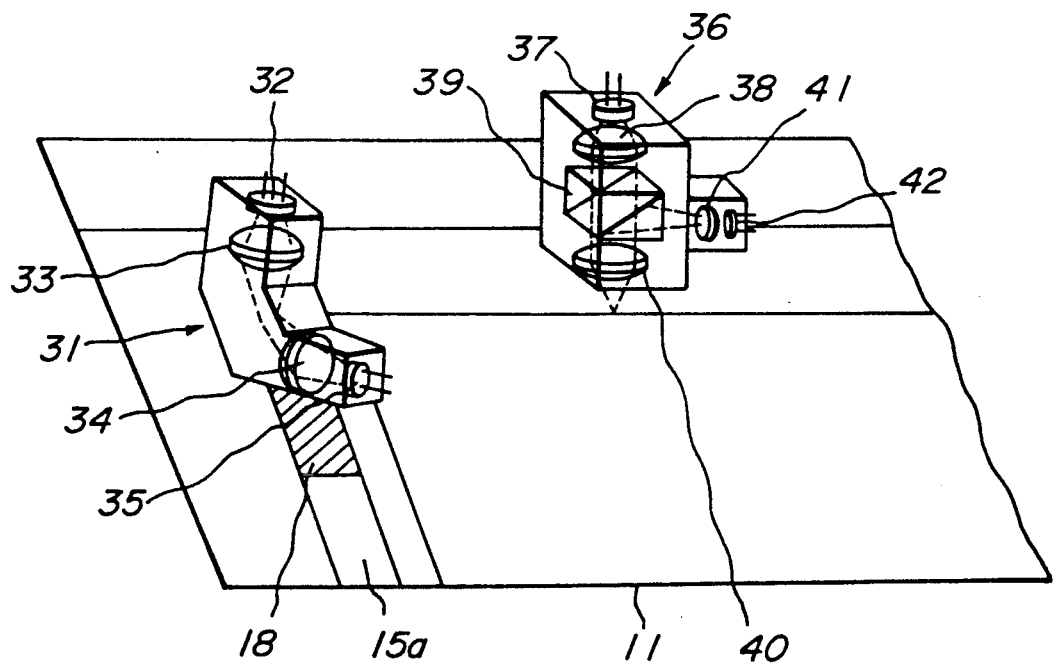

FIG_9
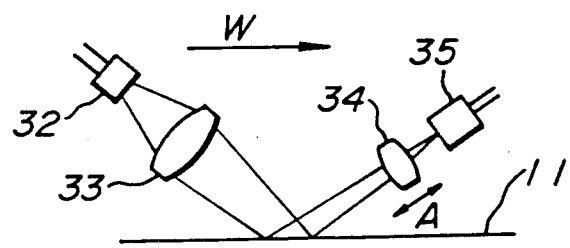
FIG_10
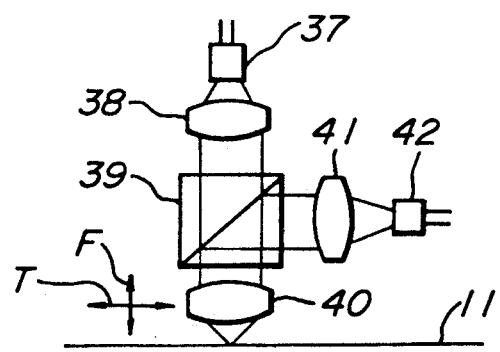

FIG_11
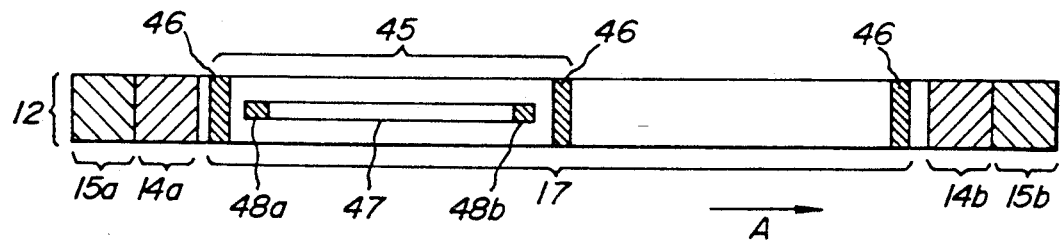
FIG_12
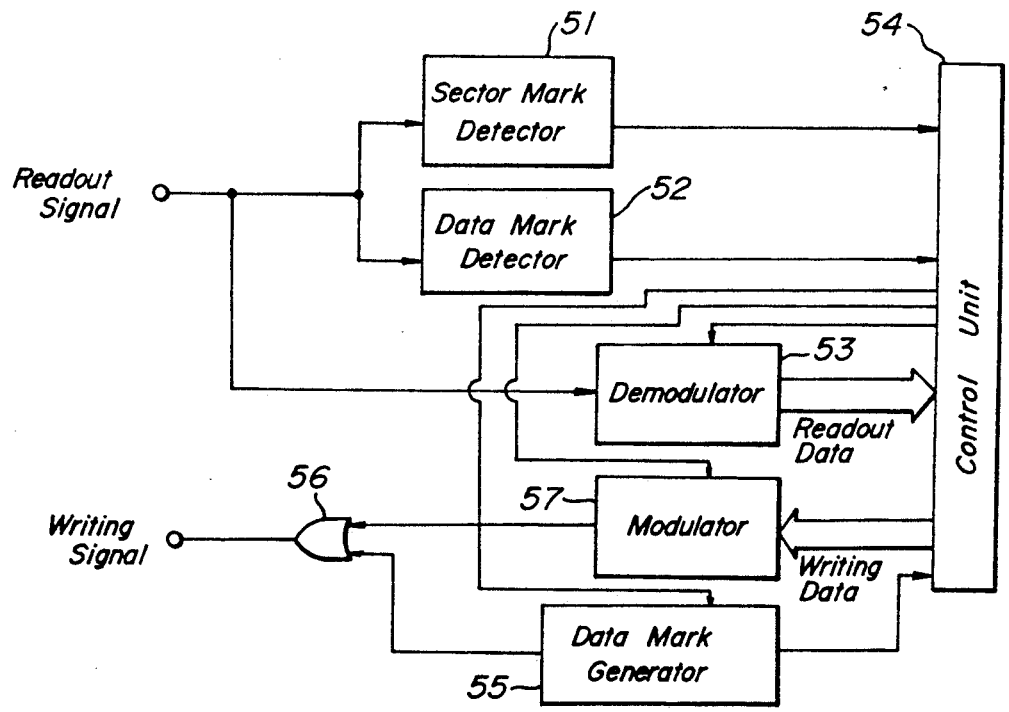

FIG_13A
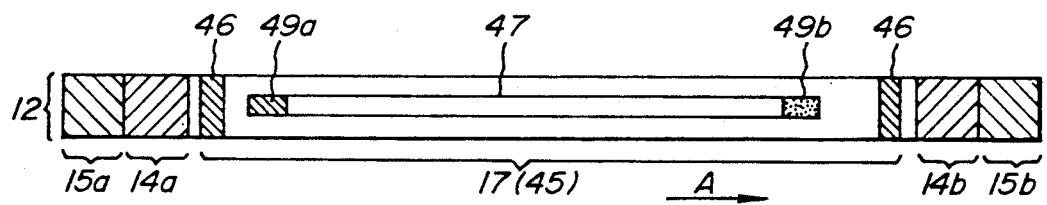
FIG_13B
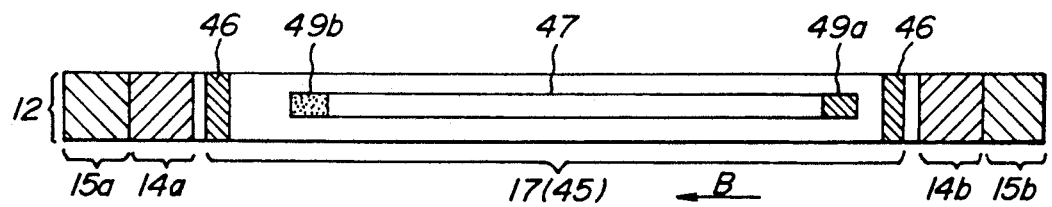

FIG.14
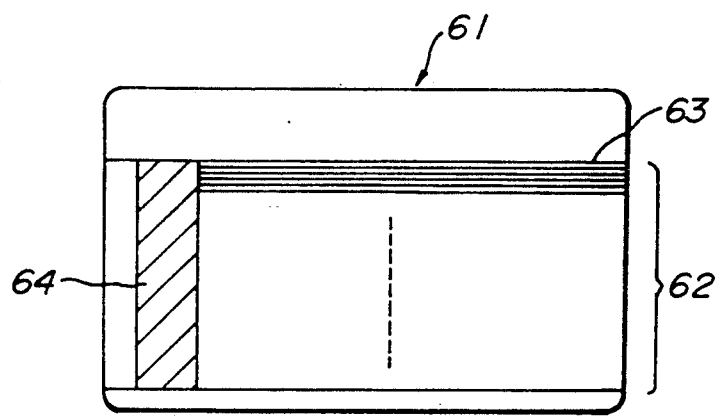
FIG.15A
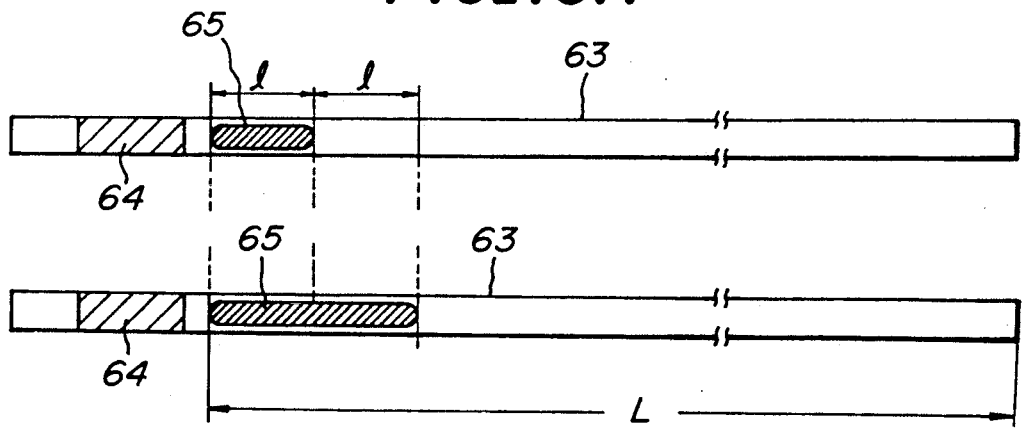
FIG.15B

FIG_16A
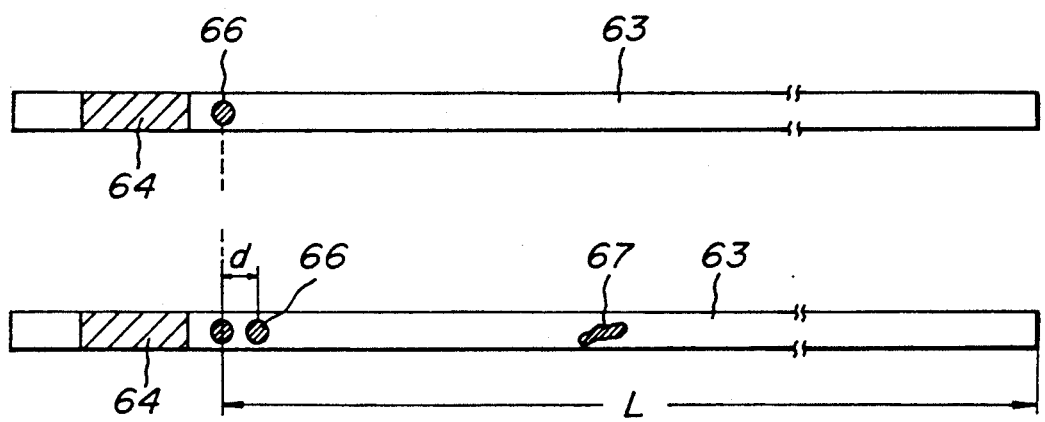
FIG_16B
FIG_17
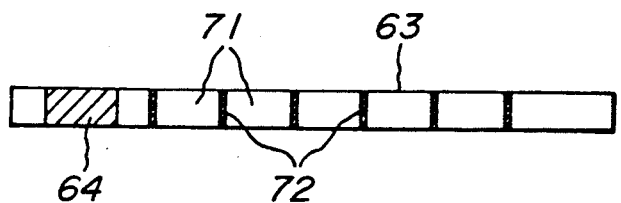

OPTICAL RECORD MEDIUM INCLUDING A DATA REGION, AN IDENTIFICATION REGION AND A CONTROL DATA REGION, AND A METHOD OF RECORDING SIGNALS ON THE OPTICAL RECORD MEDIUM

This is a continuation of application Ser. No. 07/121,798, filed Nov. 17, 1987, now abandoned.

BACKGROUND OF THE INVENTION

1. Field of the Invention and Related Art Statement

The present invention relates to an optical record medium such as an optical card and an optical disc, and a method of recording data signals and control signals on the optical record medium.

Conventionally, there has various kinds of optical discs and optical cards are known. In an optical disc of the write once type, since the reliability of a recorded signal is relatively low and the recorded signal could not be erased, it is not suitable to record control data for managing the disc on the disc itself. Therefore, the control data of the optical disc is usually recorded on a separate reliable record medium of the rewritable type such as a floppy disc.

In the optical record medium of the write once type, if the previously recorded information is scarecely referred to, it is not always necessary to rewrite the control data for managing the record medium. In such a case, it is sufficient to record a new control data signal in addition to the previously recorded signal. Such an optical card is disclosed in PCT/US82/00187, and could be used in a prepaid card system. In such a system, it is sufficient to detect a remained amount of money promptly.

FIG. 1 is a schematic view showing the construction of a conventional optical card. In this embodiment, an optical card 1 comprises a data record region 2 in which a plurality of tracks each extending along a card longitudinal direction are parallely arranged in a card width direction. The data record region 2 has an ID region 3 in which track addresses and/or sector addresses are previously recorded, and a data region 4 in which data are to be recorded.

In the optical record medium of the write once type mentioned above, since the data is not rewritten, it is necessary to manage the data by means of the control information representing an attribute of the latest recorded data. Various methods for managing the data by means of the control information have been known as follows.

(1) Record the control information on a rewritable record medium such as a floppy disc in a host computer, and manage the data by means of the control information on the floppy disc.
(2) Record the control information on the optical record medium, read the control information into a RAM in the host computer, manage the data by means of the control information in the RAM and rewrite the latest control information in the RAM, and rewrite the latest control information on the optical record medium in a region different from a region in which the previous control information has been recorded.

FIG. 2 is a schematic view illustrating a prepaid card system using the optical card shown in FIG. 1 and effecting the management of card by means of the first method (1). The optical card 1 is set in a read/write device 5 and a remained amount of money recorded on the card is read out and is sent to a host computer 6. In the host computer 6, an amount of money which is paid at this time is subtracted from the remained amount of money and then the newly calculated amount of money is recorded as a new remained amount of money on the card 1 by means of the read/write device 5. The new remained amount of money is recorded in the data record region 4 at such a position next to a position at which the previous remained amount of money has been recorded.

However, in the method (1) mentioned above, if a large amount of optical record media are to be managed, it is necessary to use a large amount of memories for the control information and thus the system is liable to be expensive in cost. Moreover, if the system is composed as an on-line system, it is necessary to transfer the control information between a plurality of host computers which have to be always remain in an operational condition, and thus, an efficiency of using the optical record medium becomes low. Further, in the off-line system, data recorded on floppy discs has to be exchanged every day, and therefore the host computers could not be spread widely.

Further, in the method (2) mentioned above, since the renewed control information is recorded on the optical record medium at a position next to the previously recorded position, the data record region is decreased every time the control information is renewed. This disadvantage is very serious for the optical card system, because an amount of storage of the optical card is relatively small as compared with that of the optical disc.

In the optical card of the write once type, the data is recorded on successive tracks in the data record region. In such a case, it is necessary to detect the last track on which the latest data has been recorded. In the known method (2), the last track is detected by successively scanning the tracks from the first track. Then, it is apparent that a time period necessary for detecting the last track is liable to be long. General optical cards have a record capacity of up to several MBs and comprise several thousand tracks, so that in an extreme case, several minutes are required until the last track is found.

SUMMARY OF THE INVENTION

The present invention has for its object to provide a novel and useful optical record medium in which control data for managing the optical record medium can be recorded in such a manner that the optical record medium can be managed effectively and can be advantageously utilized in both the on-line system and the off-line system.

It is another object of the invention to provide an optical record medium having a number of tracks, in which one or more tracks can be utilized as tracks for recording control data for managing the optical record medium.

It is still another object of the invention to provide a novel and useful method of recording a data signal and a control signal for managing an optical record medium on the optical record medium in such a manner that the optical record medium can be utilized in an efficient manner.

According to the invention, the optical record medium comprises
a substrate;

a first area provided on the substrate and defining a data region in which a plurality of data tracks for recording a data signal are provided in parallel with each other;

a second area provided on the substrate and defining an identification region in which addresses of said data tracks are recorded; and a third area provided on the substrate and defining a control data region in which a control data signal for managing the optical record medium is recorded such that a control data signal for a data track is aligned with the relevant data track; whereby the identification region and control data region are extended in a track width direction.

In a preferred embodiment of the optical record medium according to the invention, the identification region and control data region are provided on both sides of the data region viewed in a track direction perpendicular to the track width direction. Such an optical record medium can be scanned from both sides of the optical record medium in an efficient manner. Further, in such an optical record medium, front and rear data marks are recorded at front and rear ends of a data record region in a data track. Then a data signal recorded in the data track can be read out even if a reading direction is opposite to a writing direction.

According to a further aspect of the invention, a method of recording on an optical record medium a data signal and a control data signal for managing the optical record medium having a substrate, a first area defining a data region in which a number of tracks are provided in parallel with each other and a second area defining an identification region in which addresses of tracks are recorded, comprising the steps of:

selecting at least one track among said tracks as a control data track;

recording a data signal in a data track which is not selected as the control data track; and recording a control data signal for managing the optical record medium in the control data track.

In the above mentioned method according to the invention, one or more control data tracks can be selected at will from the tracks provided on the optical record medium, and thus, the versatility of the record medium can be enhanced to a great extent.

BRIEF DESCRIPTION OF THE DRAWINGS

FIG. 1 is a schematic view showing the known optical card;

FIG. 2 is a block diagram illustrating a known prepaid card system;

FIG. 3 is a schematic view depicting an embodiment of the optical card according to the invention;

FIG. 4 is a schematic view illustrating the construction of a track of the optical card of FIG. 3;

FIGS. 5A and 5B are a schematic view showing a part of the optical card shown in FIG. 3 and a signal waveform of a reproduced signal, respectively;

FIGS. 6A and 6B are a schematic view illustrating a part of the optical card according to another embodiment of the invention and a signal waveform of a reproduced signal, respectively;

FIG. 7 is a schematic plan view depicting another embodiment of the optical card according to the invention;

FIG. 8 is a perspective view showing the construction of a control data reading head and a data writing/reading head;

FIG. 9 is a schematic view showing the construction of the control data reading head;

FIG. 10 is a schematic view illustrating the construction of the data writing/reading head;

FIG. 11 is a schematic view depicting another embodiment of the optical card according to the invention;

FIG. 12 is a block diagram showing the construction of a signal processing device for use in a system utilizing the optical card of FIG. 11;

FIGS. 13A and 13B are schematic views illustrating still another embodiment of the optical card according to the invention;

FIG. 14 is a schematic view showing still another embodiment of the optical card according to the invention;

FIGS. 15A and 15B are schematic views showing an embodiment of a control data track of the optical card of FIG. 14;

FIGS. 16A and 16B are schematic views illustrating another embodiment of the data control track; and FIG. 17 is a schematic view depicting still another embodiment of the control data track.

DESCRIPTION OF THE PREFERRED EMBODIMENTS

FIG. 3 is a schematic view showing an embodiment of the optical record medium according to the invention in the form of the wallet-size optical card. The optical card 11 comprises a substrate and a record area 13 provided on the substrate and defining a data region on which a number of data tracks 12 extending in a longitudinal direction of the card are provided in parallel with each other. In order to read data out of the card 11 while the card and a reproducing head are relatively moved in the longitudinal direction of the card from both sides thereof, i.e. in the right and left hand sides of the card in FIG. 3, on the record area 13 there are provided identification (ID) regions 14a and 14b in which track addresses have been previously recorded. In the present embodiment, there are further arranged mark regions 15a and 15b adjacent to the ID regions 14a and 14b, respectively. In the mark regions 15a and 15b, there are recorded marks at such positions that tracks which are aligned with the marks in the longitudinal direction have been already recorded with data. That is to say, when a mark is recorded in respective mark record regions 15a, 15b, a track which is aligned with the thus recorded mark is denoted to be filled with data and no new data can be recorded in the relevant track.

FIG. 4 is a schematic view showing the construction of the track 12 on an enlarged scale. The track 12 is defined by a pair of guide tracks 16 having a relatively low reflectivity. The guide tracks 16 are used to detect a focussing error and a tracking error. In the ID regions 14a and 14b, there is recorded a track address composed of a plurality of bits, in the present embodiment five bits. One of a bivalent values of a bit is represented by a pit having a relatively low reflectivity and the other bivalent value is denoted by a pit having a relatively high reflectivity. Between the ID regions 14a and 14b there is provided a data record area 17 in which data is recorded as pits. When the data has been recorded on the data record area 17, marks 18a and 18b are recorded on the mark regions 15a and 15b, respectively. The marks 18a, 18b are formed by portions having the low reflectivity, and can be recorded by scanning corresponding portions of the card with a laser beam having a writing power. In FIG. 3, a section 19 represents a track portion in which the data recording has been finished and a section 20 denotes a track portion in which the data has not been recorded.

As shown in FIG. 5A, when the mark region 15a is scanned in a track width direction W with the aid of an optical reading head, a signal level of a reproduced signal is changed as illustrated in FIG. 5B at a boundary position between the recorded track section 19 and the non-recorded track section 20. Therefore, by comparing the reproduced signal level with a suitable threshold level $V_{th}$, it is possible to detect the last track in the recorded track section 19 in an easy and prompt manner.

In the embodiment so far explained, the marks 18a, 18b are recorded in the mark regions 15a and 15b in such a manner that they extend substantially over the whole width of the data track and the marks are readout with the aid of the reading light beam having a relatively large diameter. Therefore, the reproduced signal has a continuous waveform as shown in FIG. 5A. It is also possible to record the marks 18 having a small width which is substantially equal to a half of the width of the data track as shown in FIG. 6A at a center of the track. In case of recording such a thin mark 18, the diameter of the reading light beam is decreased. When the mark region 15a is scanned with the reading light beam in the track width direction W, the reproduced signal has a period which is changed at the boundary between the recorded track section and the non-recorded track section as depicted in FIG. 6B. That is to say, the period of the reproduced signal for the recorded track section becomes a half of that for the non-recorded track section. In this case, the resolving power of the optical system of the reading head and the frequency characteristic of the signal processing circuit are selected such that the above mentioned change in the period of the reproduced signal can be detected. In this manner, it is possible to detect the last recorded track by detecting the change in the period of the reproduced signal obtained by scanning the mark region 15a, 15b in an easy and prompt manner. It is preferable to provide in the signal processing circuit a band pass filter.

As explained above, according to the invention, the marks 18 are recorded in the mark regions 15a, 15b at such positions that the marks are aligned with recorded tracks. Then, by scanning one of the mark regions 15a, 15b with the reading light beam in the track width direction W, it is possible to detect the last recorded track. The mark regions 15a, 15b may be scanned by the usual data reading head or a separate mark reading head without a tracking control faculty. In case of scanning the mark regions with the aid of the usual data reading head, tracking coil of a tracking control unit is preferably shortcircuited to restrict the movement of the head in the tracking direction W perpendicular to the track direction.

FIG. 7 is a schematic view showing another embodiment of the optical card according to the invention. In this embodiment, an optical card 21 comprises two track regions 22 and 23 divided in the longitudinal direction of the card, two ID regions 24 and 25 each provided on left sides of the data record regions 22 and 23, respectively, and two mark regions 26 and 27 each arranged on left sides of the ID regions 24 and 25, respectively. Track addresses of tracks in the data record region 22 have been previously recorded in the ID region 24 and track addresses of tracks in the data record region 23 have been previously recorded in the ID region 25. When data has been recorded in a track in the region 22, a mark such as the marks 18a, 18b and 18 shown in FIGS. 4 and 6A is recorded in the mark region 26 at such a position that the mark is aligned with the relevant track. Therefore, in the optical card of the present embodiment, the number of tracks becomes twice of the number of tracks of the optical cards of the previous embodiments, but a length of a track become a half of a length of a track of the previous embodiments. In FIG. 7, a reference numeral 28 represents a recorded track section and 29 denotes a non-recorded track section.

FIG. 8 is a schematic view showing an embodiment of the recording/reproducing device which utilizes the optical card according to the invention. In this embodiment, the device comprises a first head 31 for scanning the mark region 15a on the optical card 11 shown in FIG. 3, and a second head 36 for reading the data recorded in the data record region and ID regions 15a, 15b and for recording data and marks 18a, 18b. As shown in FIG. 9, the mark region scanning head 31 comprises light source 32 such as light emitting diode for emitting light, illumination lens 33 for projecting a light beam upon the optical card 11 obliquely, imaging lens 34 for forming an image of an illuminated card portion and photodetector 35 receiving the image. The imaging lens 34 is moved a direction of its optical axis as shown by an arrow A in FIG. 9 in accordance with a focussing error detected by processing an output signal of the photodetector 35.

As illustrated in FIG. 10, the writing/reading head 36 comprises laser diode 37, collimator lens 38, beam splitter 39, objective lens 40, condensor lens 41 and photodetector 42. A laser light beam emitted from the laser diode 32 is projected upon the optical card 11 as a fine spot by means of the collimator lens 38, beam splitter 39 and objective lens 40. A light flux reflected by the optical card 11 is collected by the objective lens 40 and is reflected by the beam splitter 39. Then the reflected light flux is made incident upon the photodetector 42 via the condensor lens 41. The objective lens 40 is moved in a direction F parallel to the optical axis in accordance with a focussing control signal as well as in a direction T perpendicular to the optical axis and the track direction in accordance with a tracking control signal. Since mechanisms for effecting the focussing and tracking control are well known in the art, their detailed explanation is dispensed with.

When a data signal is recorded in a data track, the power of laser beam emitted from the laser diode 37 is increased up to a writing level and the brightness of the laser beam is modulated in accordance with the data signal to be recorded. In case of recording the mark 18, the power of the laser beam is increased to the writing level and the laser beam is projected upon the optical card 11 without being modulated. In case of reading the track addresses and data signals recorded in the ID regions and data tracks, the power of the laser beam is decreased to a reading level.

The mark scanning head 31 and writing/reading head 36 are secured to the same head feeding mechanism such that the light spots emitted from the heads are made incident upon the optical card 11 at such positions that they are aligned in the track direction. Then after the last recorded track is detected, the operation of reading a data signal recorded in the relevant track or the operation for writing a data signal in a next data track can be initiated at once.

It should be noted that in the above embodiments the optical record medium is formed as the wallet-size optical card, but it may be constructed in various shapes. For instance, the optical record medium may be formed as an optical disc. In such an optical disc, a number of data tracks are provided concentrically and the ID region and mark region may extend in a radial direction of the disc. In this case, the mark for representing a recorded track is aligned with the relevant data track viewed in a circumferential direction.

As explained above, in the optical record medium according to the invention, a mark indicating that a track has been filled with data is recorded in the mark region provided on the medium at such a position that the mark is aligned with the relevant track viewed in the track direction. Therefore, the last recorded track can be detected promptly only by scanning the mark region in the track width direction. Therefore, the optical record medium can be advantageously utilized in the off-line system including a number of writing/reading devices, while the data processing time can be shortened and the efficiency of the system can be improved.

In the known optical card 1 shown in FIG. 1 there are provided a number of tracks which are arranged in parallel with each other, and the ID region is provided only on the left side of the data track region. In a track, there are provided one or more sectors which are separated from each other by sector marks provided at both ends of the sectors. Further, a data mark is recorded at a front end of a data record area in the track, said data mark being slightly spaced from the sector mark. Therefore, in case of reading the data from the optical card, only after the sector mark and data mark have been readout successively, the reproduced signal is extracted as an effective or correct data signal. In case of effecting the data writing, after the sector mark has been read out, at first the data mark is recorded and then the data signal is recorded. In almost all the known optical card, since the writing and reading are effected always in a predetermined direction (in FIG. 1 from left to right), so that the efficiency of writing and reading is rather low. That is to say, the writing or reading for a single track requires a reciprocal movement of the card relative to the writing/reading head. In order to mitigate the above mentioned drawback, in the optical card 11 shown in FIG. 3, the ID regions 14a and 14b are provided on respective sides of the tracks 12, so that the writing or reading can be effected in both directions and the efficiency can be increased.

However, if the data mark is recorded only at the front end of the data record area, the track can be read correctly only from the same direction as that in which the data signal has been recorded in the relevant track, because if the track is scanned in an opposite direction to that from which the data signal has been recorded, the effective data signal could not be extracted due to the lack of the data mark.

FIG. 11 is a schematic view showing an embodiment of the optical card according to the invention. In the present embodiment, the track 12 comprises a data record region 17, ID regions 14a and 14b provided on respective sides of the data record region, and mark regions 15a and 15b provided adjacent to the ID regions. The data record region 17 is divided into sectors 45 which are separated from each other as well as from the ID regions by sector marks 46. In a sector 45 there is provided a data record area 47 and data marks 48a and 48b which are provided at front and rear ends of the data record area.

FIG. 12 is a block diagram depicting an embodiment of data writing/reading device utilizing the optical card shown in FIG. 11. The optical card is moved relative to a writing/reading head which has a faculty to read out sector marks, data marks and data pits as well as to write data marks and data pits. A readout signal from the head is supplied to sector mark detector 51, data mark detector 52 and demodulator 53. In case of reading, sector mark signal and data mark signal detected by the detectors 51 and 52, respectively are supplied to a control unit 54. The control unit 54 controls the demodulator 53 in accordance with the sector mark signal and data mark signal such that only an effective data signal read out of the data record area 47 is exclusively demodulated and is entered into the control unit 54.

When a new data signal is to be written in a vacant sector 45, the sector mark signal detected by the sector mark detector 51 is supplied to the control unit 54. Then the control unit 54 sends a command to a data mark generator 55 to generate a data mark signal. This data mark signal is supplied via an OR gate 56 to the writing/reading head and the front data mark 48a is recorded in the sector 45 at the front end of the data record area 47. Then the control unit 54 supplies the data signal to be recorded to a modulator 57 and a driving signal for the light source provided in the head is modulated in accordance with the data signal. The modulated driving signal is supplied via the OR gate 56 to the writing/reading head to record data pits in the data record area 47. After the data pits have been recorded, the control unit 54 sends again the actuating command to the data mark generator 55 and the rear data mark 48b is recorded at the rear end of the data record area 47 viewed in the scanning direction A. In this manner, the data marks 48a and 48b are recorded at both extreme ends of the data record area 47. The above mentioned operation is also carried out when the scanning is effected in the direction opposite to the direction A. Therefore, the writing and reading efficiency can be increased materially.

FIGS. 13A and 13B are schematic views showing another embodiment of the optical card according to the invention. In the present embodiment, a front data mark 49a is different from a rear data mark 49b. A data record area 47 shown in FIG. 13A is recorded in a scanning direction A, while a data record area 47 in FIG. 13B is formed by effecting the writing in a direction B opposite to the direction A. Therefore, upon the reading, it is possible to know the writing direction A or B by discriminating the data marks 49a and 49b. That is to say, if the rear data mark 49b is first detected, the reading direction can be confirmed to be in opposition to the writing direction. Therefore, the data can be read out much more efficiently and positively.

FIG. 14 is a schematic view illustrating another embodiment of the optical card according to the invention. In the present embodiment, an optical card 61 comprises a track region 62 in which a large number of tracks are provided in parallel with each other. In the present embodiment, one or more predetermined tracks are used as control data tracks in which the control data for managing the optical card is recorded. In FIG. 14, the uppermost track 63 is used as the control data track. On the left side of the track region 62 there is provided an ID region 64 in which track addresses have been previously recorded. The ID region 64 may be formed by printing.

Each time after a data signal has been recorded in a data track, a mark 65 having a predetermined length l is recorded in the control data track 63 as shown in FIG. 15A. That is to say, after a data signal is recorded in a first data track, an address of the relevant track in the ID region 64 is read out to confirm that the relevant track belongs to the data track and then the mark 65 having the given length l is recorded in the control data track 63. After a data signal has been recorded in a second data track, a mark 65 is again recorded in the control data track 63 as shown FIG. 15B such that the newly recorded mark is brought into contact with the previously recorded mark to form a mark 65 having a length of 2l. In this manner, every time data signals have been recorded in data tracks, marks each having the length l are recorded without providing a space therebetween.

Now it is assumed that the track has a data record area having a length of L, then it is possible to record the marks 65 the maximum number of which is equal to L/l. In this manner, according to the optical card of the present embodiment, it is possible to know the number of data tracks in which the data has been already recorded by detecting the length of the mark 65 recorded in the control data track 63. If the data signals have been recorded in the data tracks successively from the first data track, an address of the last recorded data track can be detected only by detecting the length of the mark 65.

The length of the mark 65 in the control data track 63 may be detected by any known method of measuring the length. For instance, the optical card and the reading head are relatively moved in the track direction and clock pulses having a constant period are counted by a counter as long as the mark 65 is detected. Then the total length of the mark 65 can be known from a count value in the counter. If it is required to manage the data tracks more than L/l, a plurality of tracks may be used as the control data track. Since the control data track has the same construction as the data track, any desired number of tracks may be utilized as the control data track. When a plurality of control data tracks are utilized, the mark 65 is recorded in the control data tracks orderly.

FIGS. 16A and 16B are schematic views illustrating another embodiment of the optical card according to the invention. In this embodiment, every time data signals have been recorded in data tracks, pit marks 66 are recorded in the control data track 63, while a space having a distance d is interposed between successive pit marks.

In the present embodiment, the maximum L/d pit marks 66 can be recorded in the control data track 63, and by counting the number of pit marks 66 recorded in the control track 63, it is possible to know how many data tracks have been already recorded or used. When the data tracks are used orderly, an address of the last recorded data track can be known promptly.

In this embodiment, if a non-pit portion 67 having a reflectivity similar to the pit 66 is existent in the control data track 63, the portion might be erroneously detected as a pit. However, since the pits 66 are recorded at the regular interval d and the non-pit portion 67 does not appear at the regular interval, the non-pit portion can be removed by passing the reproduced signal through a band pass filter having a pass band corresponding to the interval d of the pits 66. In this manner, the pits 66 can be correctly readout without being affected by the non-pit portion 67.

FIG. 17 is a schematic view illustrating still another embodiment of the optical card according to the invention. In this embodiment, the data record area in the track is divided into a plurality of sectors 71 by sector marks 72. In such a card, both the last recorded sector and a data track to which the last recorded sector belongs have to be managed. The sector mark 72 may be formed by a special pit pattern which can be detected optically during the data reading or holes or slits which can be detected mechanically.

In case of using the above mentioned optical card the control data for managing the card has to be recorded in such a manner that not only recorded tracks, but also recorded sectors can be identified. That is to say, every time a data signal has been recorded in a sector, a mark having a predetermined length is recorded continuously in the control data track or a pit mark is recorded at a predetermined distance in the control data track.

Now it is assumed that N is the number of sectors in a single data track and P is the number of marks or pits recorded in the control data track. Then, [P/N] represents the number of data tracks having the data signals recorded therein, wherein [P/N] is the maximum integer number which does not exceed a value of P/N. Further, {[P/N]+1}th data track represents a data track which includes the last recorded sector and one or more non-recorded sectors, and the last recorded sector is denoted by {P-[P/N]×N}. In this manner, an address of the data track including the last record sector and an address of the last record sector in the relevant data track can be found by scanning the control data track.

It should be noted that the control data track 63 shown in FIG. 17 comprises the sector marks 72, but the control data track may not include the sector mark. In case of using the control data track having the sector marks, the marks or pits have to be recorded in such a manner that they do not interfere with the sector marks and the marks or pits have to be read out separately from the sector marks.

The present invention is not limited to the embodiments explained above, but may be modified in various ways. For instance, in the above embodiment the control data for managing the card defines the recorded data tracks by means of the special marks or pits, but addresses of recorded data tracks may be recorded in the control data track. Further, the optical data record medium such as the optical card and optical disc has a relatively high error rate, and thus immediately after a data signal has been record, the recorded data signal is readout to check the recorded condition (Read After Write). In such a Read After Write process, when an error is detected, the same data signal is recorded again in another address position. Such a process is termed an alternate process. Then an alternate address is recorded in the control data track as the control data.

What is claimed is:

1. A method of recording on an optical record medium a data signal and a control data signal for managing the optical record medium having a substrate, a first area defining a data region including a plurality of parallelly arranged tracks and a second area defining an identification region in which addresses of tracks are recorded, comprising the steps of:

selecting at least one track among said tracks as a control data track;

recording a data signal in a data track which is not selected as said control data track; and recording a control data signal representing a last data track in which the latest data signal has been recorded, for managing the optical record medium in said control data track;

wherein marks having a constant length are recorded in said control data track each time data signals are recorded in the data tracks such that successive marks are brought into contact with each other in the longitudinal direction.

2. A method of recording on an optical record medium a data signal and a control data signal for managing the optical record medium having a substrate, a first area defining a data region including a plurality of parallelly arranged tracks and a second area defining an identification region in which addresses of tracks are recorded, comprising the steps of:

selecting at least one track among said tracks as a control data track;

recording a data signal in a data track which is not selected as said control data track; and recording a control data signal representing a last data track in which the latest data signal has been recorded, for managing the optical record medium in said control data track;

wherein pit marks are recorded in said control data track each time data signals are recorded in the data tracks such that successive pit marks are aligned at a constant pitch in the direction of arrangement of the tracks.

* * * * *